Feb. 13, 1951         C. E. CHRISTOPHERSEN         2,541,206
MULTIPURPOSE CLAMP
Filed Jan. 21, 1948

INVENTOR.
CLARENCE E. CHRISTOPHERSEN
BY J. Edwin Coates
ATTORNEY

Patented Feb. 13, 1951

2,541,206

UNITED STATES PATENT OFFICE 2,541,206

MULTIPURPOSE CLAMP

Clarence E. Christophersen, Los Angeles, Calif., assignor to Marman Products Company, Inc., Inglewood, Calif.

Application January 21, 1948, Serial No. 3,449

9 Claims. (Cl. 24—19)

This invention relates to band clamps and more particularly to that class of band clamps which is adapted to grip objects of varying shapes and dimensions.

One of the principal requirements of such a clamp is that it be provided with a band of flexible material which will readily accommodate itself to the shape of the article to be clamped, whether it is round, square, or irregular. There are now available several varieties of clamps using thin stainless steel bands one end of which is permanently attached to one part of the tightening device and the other end of which is adjustably attached to another part of the tightening device.

The adjustable attachment of these known types is accomplished by bending a portion of the band sharply over an anchoring member on the tightenings device. If the clamp is later used on a larger object this kink must be straightened out. Such straightening tends to weaken the band at that point, resulting in ultimate failure.

The general object of the present invention is to provide a clamp which is adapted to grip objects having a very wide range of shapes and dimensions and which may be re-used indefinitely without weakening or failure of the band portion. The construction and arrangement of parts are such that when the clamp is applied to a relatively small object the excess band material is firmly held in position out of the way of a workman. In one form of the invention the excess band material may be wrapped a second time around the workpiece, thus increasing the clamping action.

The invention generally comprises a narrow elongate band of flexible material such as stainless steel, a rigid saddle member having a substantially planar bearing surface, a tension member adapted to slide along the bearing surface, and a force applying means to move the tension member. The saddle is provided with at least one aperture in its base portion, and an end of the band may be passed through the aperture and bent over the end of the base to anchor it in place. The medial portion of the band is wrapped around the object to be clamped and the free end is passed through the aperture mentioned above. The tension member is provided with a pair of opposed, relatively movable jaws between which the free end of the band is passed. When the band has been pulled snugly about the work piece or pieces the jaws are manipulated to grip the band, after which the force applying means is operated to urge the tension member in a direction to tighten the band about the work piece.

The jaws of the tension member are serrated or roughened to improve their gripping action but they do not bend the band and consequently produce no weakening kink. Since they may grip any portion of the band the clamp is truly universal and may be applied to any size article within the range of the band's length. If a small article is clamped, the excess band material may be wrapped around a second time and be gripped by the tension member. In one form of the invention a second aperture is provided in the base of the saddle adjacent the first aperture. With this construction the second wrap of the band directly overlies the first and when the band is tightened the friction between the two wraps increases the resistance of the clamp to slipping and loosenings.

The jaws of the tension member are supported within a generally rectangular frame and novel resilient means are provided for retracting the movable jaw when the gripping force is released. These resilient means also serve to retain the jaw within the frame and guide its movements.

The presently preferred embodiments of the invention are illustrated in the accompanying drawing in which:

Figure 3 is a sectional view taken on line 3—3 of Figure 1;

Figure 1:
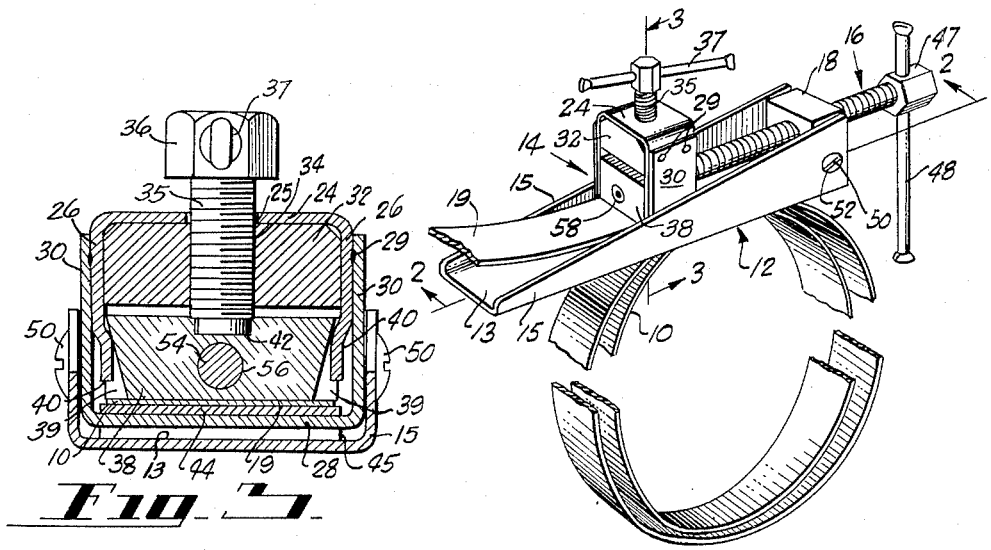
Figure 1 is a perspective view of the clamp showing the double wrap feature, with parts of the band broken away.
Figure 5:
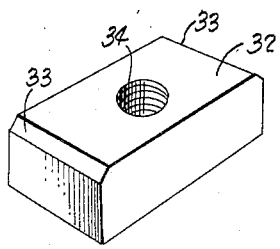
Figure 5 is a perspective view of the screw block portion of the tension member illustrated in section in Figure 3.

The clamp as a whole is shown in Figure 1 in which band 10 has one end anchored to a portion of the saddle 12. The band is wrapped about itself and the free end is engaged by tension member 14 which in turn may be moved along the length of the saddle by the force applying member 16 carried by trunnion 18.

Figure 2:
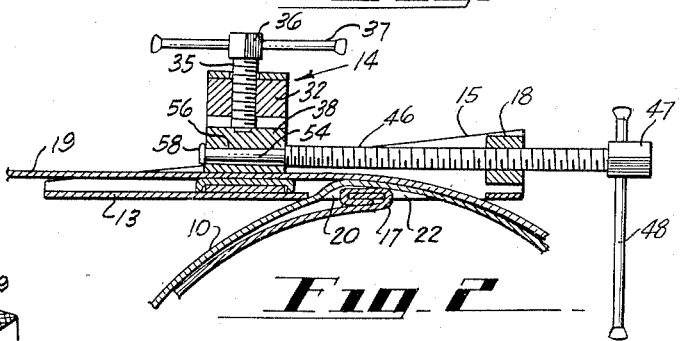
Figure 2 is a sectional view taken on line 2—2 of Figure 1.

The saddle includes a base 13 having a generally planar bearing face and side walls 15 tapering from end to end to form a channel guide for the tension member 14. As best seen in Figure 2, the base of the saddle is provided with a pair of apertures 20 and 22 adjacent each other and fairly close to one end of the saddle. The end 17 of band 10 passes upwardly through aperture 22, overlies the base portion between the apertures, and is bent back through aperture 20 to anchor the end firmly to the saddle. The medial portion of the band may be passed one or more times around the work piece, depending on the length of the band, and the free end engaged by tension member 14. If the band is to be passed a second time about the work piece it is led in through aperture 22 and out through aperture 20. In this fashion the second loop lies in contact with the first throughout practically its entire length.

The free end 19 of the band passes through aperture 22, overlying the previous wrap, and is engaged between jaw elements (to be later described) of the tension member 14 which is adapted to draw the end leftwardly as seen in Figure 2 and tighten the band about the article to be clamped. The tension member includes an upper U-shaped member of strip material having a horizontal base 24 and downwardly depending legs 26, 26, and a lower U-shaped member of strip material having a horizontal base 28 and upwardly extending legs 30, 30. Legs 26 fit neatly within legs 30 and are spotwelded thereto at 29 to form a generally rectangular frame.

A screw block 32 of approximately the same length and width as the frame and somewhat less than half its depth, is adapted to be located within the upper part of the frame. Corners 33 are chamfered to prevent interference with the rounded corners of the frame. The screw block is provided with a central threaded bore 34 for the reception of a bolt having a threaded shank 35 and head 36, through which passes a tightening bar 37. Aperture 25 is provided in member 24 for free passage of shank 35.

Figure 6:
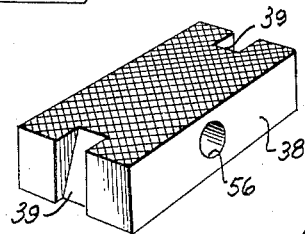
Figure 6 is an inverted perspective view of the movable jaw of the tension member.

A movable clamping jaw 38 is provided in the form of a generally rectangular block having approximately the same dimensions as the screw block. Inclined grooves or channels 39 are formed in the end walls of the jaw 38 as clearly illustrated in Figure 6, in which the jaw is shown in inverted position for greater clarity. The lower free ends of legs 26 are joggled inwardly and decreased in width to form a pair of downwardly extending fingers 40 that fit freely in channels 39. It will be seen that when the jaw 38 is in position in the frame, as in Figure 3, the fingers 40 serve as guides to direct the movement of the jaw and also as means to retain the jaw in position within the frame. The fingers are of resilient material and serve the further purpose of retracting the jaw into a non-clamping position when pressure is released. When the jaw is moved downwardly as seen in Figure 3, the inclined bottom walls of channels 39 force fingers 40 resiliently outward away from each other. This displaced condition produces horizontal spring forces which, acting against the inclined wall, produce a vertical component in the direction of movement of the jaw. When clamping pressure is released the jaw will therefore be urged upwardly to retracted position.

Jaw 38 is provided in its upper surface with a shallow bore 42 having a diameter sufficient to loosely receive the lower end of threaded shank 35. When the shank is screwed down through screw block 32 it forces the jaw into gripping engagement with the strap end 19.

Figure 7:
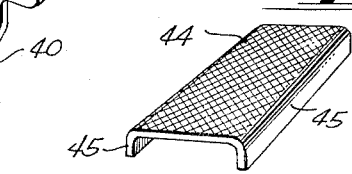
Figure 7 is a perspective view of the stationary jaw of the tension member.

A second relatively stationary jaw 44 is provided for cooperation with jaw 38. This second jaw, as seen in Figure 7, is channel shaped and includes a bridge portion and wings 45. This jaw overlies an straddles the lower frame member 28 and the wings 45 prevent it from slipping out of place. It will be noted that the gripping surfaces of the jaws 38 and 44 are knurled or otherwise roughened, as clearly indicated in Figures 6 and 7, respectively, to improve their gripping action on the band.

The tension member fits freely between the side walls 15 of the saddle 12 and slides along bearing surface formed by the base 13. Its movement is controlled by force applying member 16 which includes a threaded shank 46 having a head 47 at one end traversed by a tightening bar 48. The shank is threadedly engaged in trunnion block 18 which is provided with mounting screws 50 pivotally carried in apertures 52 in the side walls 15. The opposite end 54 of the shank is reduced in diameter and provided with a smooth surface for rotatable mounting in bore 56 of the jaw 38, the extreme end being peened over at 58 to hold the parts in assembled relation.

In using the clamp, the shank 46 is retracted to bring the tension member close to the trunnion block. The band is then passed around the work piece as previously described and the free end brought up through aperture 22 and passed between jaws 38 and 44. After the band has been pulled up as snugly as possible by hand the screw 35 is operated to move jaw 38 toward jaw 44 to tightly grip the band. Screw 46 is then manipulated to force the tension member along bearing surface 13 away from the trunnion and pull up the band 10 as tightly as desired. Since the band under tension is below the thrust line of the force applying member, the tension member will at all times be held down firmly on bearing surface 13. The overlapping wraps of the band 10, in the case where it is passed more than once around the work piece, will be in tight frictional engagement and decrease the possibility of slippage and loosening of the clamp.

To remove the clamp, the screw 46 is retracted to return the tension member toward the trunnion. Screw 35 is then backed off and the spring bias of fingers 40 will force jaw 38 upward into retracted position, thus releasing the band so that it can be unwrapped from the work piece.

It will be noted that the band is not kinked or bent in any way when gripped by jaws 38 and 44. Thus it can be used innumerable times without weakening or failure. It can be gripped at any point along its length with equal facility. This is a matter of considerable importance since these clamps, which are intended for use in the manufacture of furniture are quite large and expensive, the bands being of the order of two inches wide and three to six feet long, with the other elements of the clamp in proportion.

Figure 4:
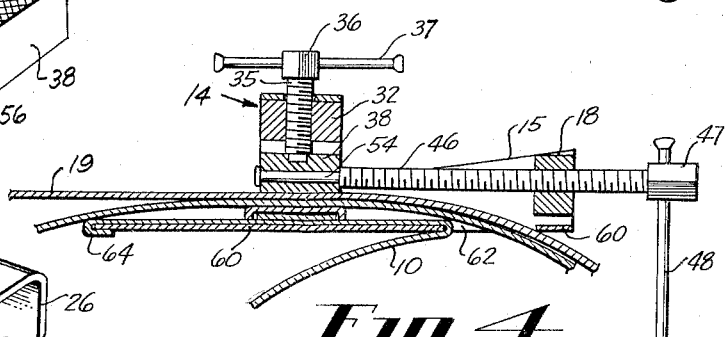
Figure 4 is a view similar to Figure 2 showing a modified form of the invention.
Figure 8:
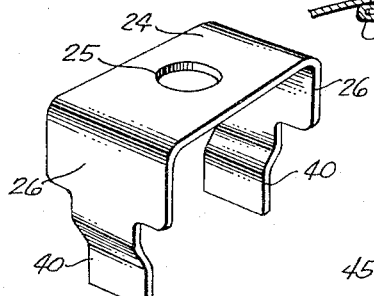
Figure 8 is a perspective view of the upper member of the frame.

The modified form of clamp, shown in Figure 4 is substantially identical in all respects to the embodiment previously described with the exception that the base 60 of the saddle is provided with only one aperture 62. The end of the band 10 passes upwardly through the aperture and overlies the major portion of the base, being bent back at 64 to anchor it thereto. If an excessive length of band remains after a single wrap around the work piece, the band is loosely wrapped in a second loop and both thicknesses pass between the jaws 38 and 44 and are gripped thereby. The band is tightened in the same way as previously described but only the inner wrap exerts any clamping action.

It will be seen that the invention described herein provides a clamp having a wide range of utility which is readily assembled and easily used. The parts are simple to manufacture and a minimum number of permanent fastenings are required.

As will be readily apparent to those skilled in the art, various changes and modifications may be made in the construction of the clamp without departing from the spirit of the invention, and it is intended that all such changes and modifications shall be embraced within the scope of the following claims.

I claim:

1. A band clamp for repeated use to embrace objects of different girths, said clamp comprising: a saddle having a guiding portion for alignment in a direction approximately tangential to the girth of an object to be clamped; a band adapted to form a loop around an object with one end portion of the band anchored to said saddle and the other end portion extending at the saddle substantially parallel with said guiding portion; tension means movable along said guiding portion of the saddle, said tension means having two jaws to grip said other end portion of the band, said jaws having gripping faces substantially parallel with the direction of movement of the tension member along said guiding portion; and means carried by the saddle to force said tension member along said guiding portion to tighten said loop.

2. A band clamp as set forth in claim 1 in which said forcing means comprises screw means acting between the saddle and the tension member.

3. A band clamp as set forth in claim 2 in which a second screw means is incorporated in said tension means to force one of said jaws towards the other.

4. A band clamp as set forth in claim 1 in which said forcing means is a screw means carried by said saddle and operatively connected with one of said jaws.

5. A band clamp as set forth in claim 4 in which said screw means is pivotally carried by said saddle for swinging movement to follow opening and closing movements of said jaw.

6. A tension member for use in a band clamp including an elongated band, a saddle, and force applying means carried thereby, said tension member comprising: a generally rectangular frame; a first jaw carried by said frame; a second jaw carried by said frame for movement toward and away from said first jaw; said second jaw having angular side walls converging in the direction of said first jaw; manually operable means to force said second jaw toward said first jaw; and resilient fingers carried by said frame in pressural contact with said angular side walls to produce a force component in the direction of movement of said second jaw to urge it away from said first jaw.

7. A tension member for use in a band clamp including an elongated band, a saddle, and force applying means carried thereby, said tension member comprising: a generally rectangular frame; a first jaw carried by said frame; a second jaw carried by said frame for movement toward and away from said first jaw; said second jaw having channel grooves formed in its opposite end walls; the bottom surfaces of said grooves converging in the direction of said first jaw; manually operable means to force said second jaw toward said first jaw; and resilient fingers carried by said frame extending into said grooves and into pressural contact with said bottom surfaces to produce a force component in the direction of movement of said second jaw to urge it away from said first jaw.

8. A tension member for use in a band clamp including an elongated band, a saddle, and force applying means carried thereby, said tension member comprising: upper and lower U-shaped members of strip material with their open ends facing each other; the upper member lying within the lower member and permanently united thereto to form a generally rectangular frame; a first jaw carried by the lower member of said frame; a second jaw carried by the upper member of said frame for movement toward and away from said first jaw; said second jaw having angular side walls converging in the direction of said first jaw; and manually operable means to force said second jaw toward said first jaw; the free ends of said upper U-shaped member being formed as resilient fingers extending inwardly toward each other and into pressural contact with said angular side walls to produce a force component in the direction of movement of said second jaw to urge it away from said first jaw.

9. A tension member for use in a band clamp including an elongated band, a saddle, and force applying means carried thereby, said tension member comprising: a generally rectangular frame; a first channel-shaped jaw overlying and straddling the lower bar of said frame and loosely engaged therewith; a second jaw carried by said frame for movement toward and away from said first jaw; manually operable means to force said second jaw toward said first jaw; guide means in the opposite end walls of said second jaw; and fingers extending inwardly from the side bars of said frame and engaging said guide means to retain said second jaw in position within said frame.

CLARENCE E. CHRISTOPHERSEN.

REFERENCES CITED

The following references are of record in the file of this patent:

UNITED STATES PATENTS

| Number | Name | Date |
|---|---|---|
| 1,243,118 | Trivigino | Oct. 16, 1917 |
| 1,311,936 | Miles | Aug. 5, 1919 |
| 2,149,760 | Carlson | Mar. 7, 1939 |
| 2,352,971 | Prochaska | July 4, 1944 |
| 2,361,520 | Worth | Oct. 31, 1944 |
| 2,370,766 | Austin | Mar. 6, 1945 |
| 2,381,349 | Hagen et al. | Aug. 7, 1945 |

FOREIGN PATENTS

| Number | Country | Date |
|---|---|---|
| 453,957 | Great Britain | Sept. 22, 1936 |
| 550,692 | Great Britain | Jan. 20, 1943 |